United States Patent Office 2,805,226
Patented Sept. 3, 1957

2,805,226

PREPARATION OF 2-ACYLAMINO-1,3,4-THIADI-AZOLE-5-SULFIDES

Richard W. Young, Riverside, and Kathryn H. Wood, Greenwich, Conn., assignors to American Cyanamid Company, New York, N. Y., a corporation of Maine No Drawing. Application January 23, 1956,
Serial No. 560,851

4 Claims. (Cl. 260—306.8)

This invention relates to a novel process of preparing 2-acylamino-1,3,4-thiadiazole-5-sulfides of the formula:

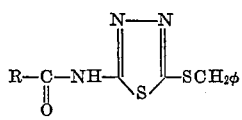

wherein R is a lower alkyl radical or a monocyclic aralkyl radical. Suitable lower alkyl substituents are methyl, ethyl, propyl, isopropyl, butyl, pentyl, amyl, hexyl, etc. and suitable aralkyl substituents are benzyl, phenethyl, phenylpropyl, phenylbutyl, etc.

The compounds produced by the novel process described herein are useful as intermediates in the preparation of hetrocyclic sulfonamides described in the Clapp and Roblin U. S. Patent 2,554,816. The heterocyclic compounds of Clapp et al, are highly useful diuretic agents because of their ability to inhibit the enzyme carbonicanhydrase. As such, the compounds of Clapp et al. are highly useful for the treatment of edema due to congestive heart failure. These compounds have also been found useful in the treatment of epilepsy and glaucoma. The usefulness of the compounds of Clapp et al. has been adequately described in the medical literature.

The preparation of the compounds described herein may be accomplished by reacting a suitable acyl isothiocyanate, such as acetylisothiocyanate, with a dithiocarbazate, such as benzyldithiocarbazate, in the presence of a suitable non-hydroxylated organic solvent, such as toluene, at temperatures ranging from room temperature to about 200° C.

The acyl isothiocyanate used in this reaction may be any suitable acyl isothiocyanate, such as acetylisothiocyanate, phopionylisothiocyanate, butyrylisothiocyanate, isobutyrylisothiocyanate, n-valerylisothiocyanate, etc.

Suitable inert organic solvents useful in this reaction are dimethylformamide, chloroform, carbon tetrachloride, dioxane, benzene, chlorobenzene, xylenes, etc.

The process of this invention may be illustrated schematically below using acetylisothiocyanate as an example of a suitable acyl isothiocyanate and benzyldithiocarbazate as an example of a dithiocarbazate.

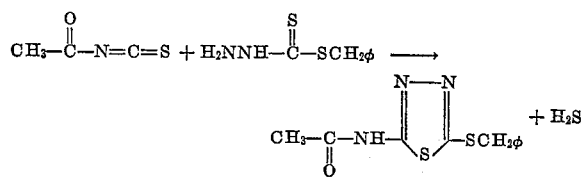

The acylaminothiadiazole sulfides of this invention may be converted to the sulfonamides described by Clapp and Roblin by forming the corresponding sulfonylchloride derivative and then amidating with liquid ammonia or ammonium hydroxide as described in the copending application of Richard W. Young, Serial No. 406,605, filed January 27, 1954.

The invention will be described in greater detail in conjuction with the following specific examples in which the parts are by weight unless otherwise specified.

Example 1

A solution of 3.97 parts of benzyldithiocarbazate and 2.02 parts of acetylisothiocyanate in 20 parts by volume of toluene is held at reflux temperature (ca. 115°) for 3 hours, after which time most of the hydrogen sulfide has evolved. The solution is cooled and concentrated in an air stream overnight. The resultant solid is slurried with ether and filtered off, giving 4.2 parts of 2-acetylamino - 5 - benzylmercapto - 1,3,4 - thiadiazole, M. P. 163–168°.

Example 2

The procedure of Example 1 is followed with the exception that tetrahydrofuran is used as the solvent and the refluxing is continued for 6 hours. The same product is obtained.

Example 3

The procedure of Example 1 is followed with the exception that 20 parts by volume of ethyl alcohol is used as the solvent. The same product is obtained.

Example 4

The procedure of Example 1 is followed except that no solvent is used and the mixture is heated on the steam bath for 30 minutes. The same product is obtained.

Example 5

The procedure of the preceding examples is followed except that an equivalent quantity of propionylisothiocyanate is used. 2-propionylamino-5-benzylmercapto-1,3,4-thiadiazole is produced.

Example 6

The procedure of the preceding examples is followed except that an equivalent quantity of butyrylisothiocyanate is used. 2-butyrylamino-5-benzylmercapto-1,3,4-thiadiazole is produced.

We claim:

1. The process of preparing compounds having the general formula:

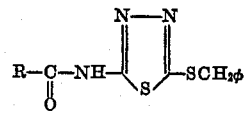

wherein R is a lower alkyl radical which comprises reacting a lower alkanoyl isothiocyanate with benzyldithiocarbazate at a temperature ranging from room temperature to about 200° C.

2. The process according to claim 1 in which alkanoyl isothiocyanate is acetylisothiocyanate.

3. The process according to claim 1 in which an inert organic solvent is used.

4. The process according to claim 3 in which the solvent is toluene.

References Cited in the file of this patent

Bambas: "Heterocyclic Compounds," pp. 143–158 (1952), Interscience Publishers, Inc., New York.